(12) United States Patent
Nedachi (10) Patent No.: US 8,607,954 B2
(45) Date of Patent: Dec. 17, 2013

(54) CONTROL APPARATUS FOR CLUTCH DRIVING MECHANISM

(75) Inventor: Yoshiaki Nedachi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 134 days.

(21) Appl. No.: 13/368,574

(22) Filed: Feb. 8, 2012

(65) Prior Publication Data

US 2012/0217118 A1 Aug. 30, 2012

(30) Foreign Application Priority Data

Feb. 25, 2011 (JP) ................................. 2011-040399

(51) Int. Cl.
*F16D 48/06* (2006.01)
*F16D 28/00* (2006.01)

(52) U.S. Cl.
USPC ..... 192/93 R; 192/84.6; 192/84.7; 192/30 W; 324/207.25

(58) Field of Classification Search
USPC .......................... 192/84.6, 84.7, 70.23, 30 W
See application file for complete search history.

(56) References Cited

U.S. PATENT DOCUMENTS

| | | | |
|---|---|---|---|
| 4,592,458 A * | 6/1986 | Matsuki et al. | 192/83 |
| 7,430,998 B2 * | 10/2008 | Stork | 123/90.17 |
| 2011/0297504 A1 * | 12/2011 | Nedachi et al. | 192/109 A |
| 2012/0242330 A1 * | 9/2012 | Uchisasai et al. | 324/207.25 |

FOREIGN PATENT DOCUMENTS

JP 3962989 B2 6/2007

* cited by examiner

*Primary Examiner* — Richard M. Lorence
(74) *Attorney, Agent, or Firm* — Squire Sanders (US) LLP (57) ABSTRACT

A control apparatus for a clutch driving mechanism can include a clutch driving mechanism which connects and disconnects a clutch. An angle sensor can detect the angle of rotation of a cam member. A cam face can include a first cam face for connecting the clutch through the linear motion of the operating member. A second cam face, formed continuously to the first cam face, can disconnect the clutch through the linear motion of the operating member. The angle sensor 21 can include a first angle sensor which can detect an angular range of the first cam face, and a second angle sensor which can detect an angular range of the second cam face. The dead zones E of the angle sensors are disposed in such a manner as not to overlap with each other.

14 Claims, 7 Drawing Sheets

CONTROL APPARATUS FOR CLUTCH DRIVING MECHANISM

BACKGROUND

1. Field

This invention relates to a control apparatus for a cam mechanism which carries out clutch driving, and particularly to a control apparatus for a clutch driving mechanism which allows, when a cam position of a cam mechanism is detected by an angle sensor, accurate detection to be carried out with a simple and less expensive configuration.

2. Description of the Related Art

As a conventional cam mechanism, a mechanism is available wherein rotation of a motor is converted into back and forth linear motion of a control shaft by a cam; the lift of an intake valve or an exhaust valve is adjusted by the position of the control shaft in an axial direction. Such a configuration is disclosed, for example, in Patent Document 1 (Japanese Patent No. 3962989). This mechanism is configured such that the operation range of the cam is specified to a predetermined range (90 degrees) by adjusting the gear ratio of a rotating member for rotating the cam in accordance with a detection range from an angle sensor.

SUMMARY

Since the cam mechanism described above is structured such that a valve for opening and closing a combustion chamber is driven, the cam member rotates only in one direction.

On the other hand, in such a mechanism that connection of a clutch is controlled by a cam member, usually rotation of an actuator is changed over between forward rotation and reverse rotation to connect and disconnect the clutch. In this instance, the rotational angle of the cam member may be within a small range. However, as regards connection and disconnection of a clutch, there is a demand to change the face shape of the cam between connection and disconnection in response to a demand to reduce or moderate a shock upon connection.

Particularly, in order to facilitate formation of such a face (cam face) as to moderate a shock upon clutch connection, rotation of a cam member preferably is not forward and backward rotation (forward and backward rotation of the same face), but rotation in one direction. As a result, the angular range over which rotation of the cam member is detected becomes large, and is restricted by a dead zone of the angle sensor. In order to avoid this phenomenon, it is necessary to use an expensive angle sensor having a large detection angular range.

The present invention has been made in view of the situation described above. It is an object of the present invention to provide a control apparatus for a clutch driving mechanism which detects rotation of a cam member with a simple configuration, without using an expensive angle sensor having such a great detection angular range, but that can detect rotation of the cam member with a high degree of accuracy over a wide angular range. This reduces overall manufacturing cost.

In order to achieve advantages such as the object described above, according to a first embodiment, a control apparatus for a clutch driving apparatus includes a cam member which rotates in synchronism with rotation of an actuator. A cam face is formed in a direction of rotation of the cam member, and an operating member contacts with the cam face to carry out back and forth linear motion. A clutch driving mechanism connects and disconnects a clutch in response to the back and forth linear motion of the operating member. An angle sensor detects the angle of rotation of the cam member, and has a dead zone against an angle of rotation which can be detected.

The cam face can include a first cam face configured to connect the clutch through the linear motion of the operating member in response to rotation of the cam member in one direction. A second cam face, formed continuously to the first cam face, is configured to disconnect the clutch through the linear motion of the operating member in response to the rotation of the cam member.

The angle sensor can be configured from a first angle sensor disposed in a state in which the first angle sensor can detect an angular range of the first cam face. A second angle sensor is disposed in a state in which the second angle sensor can detect an angular range of the second cam face. The dead zone of the first angle sensor and the dead zone of the second angle sensor are disposed in such a manner as not to overlap with each other.

According to another embodiment, the second cam face can disconnect the clutch through the linear motion of the operating member in response to the rotation of the cam member in one direction.

According to another embodiment, a decision unit can be configured to determine which one of the two angle sensors is to be used to carry out angle detection from a present position of the cam member.

According to another embodiment, the first cam face and the second cam face have different shapes from each other.

According to another embodiment, the first angle sensor has the dead zone on the second cam face side, and the second angle sensor has the dead zone on the first cam face side.

According to another embodiment, the decision unit is configured to change over the selection between the first angle sensor and the second angle sensor depending upon whether a lift state of the cam member is the top point or the bottom point.

According to another embodiment, the decision unit is configured to change over the selection between the first angle sensor and the second angle sensor in response to the direction of the rotation of the cam member at the top point and the bottom point of a lift state of the cam member.

In some embodiments, since the dead zone of the first angle sensor and the dead zone of the second angle sensor are disposed in such a manner as not to overlap with each other, the angle detection apparatus can achieve improvement in detection accuracy and reduction in cost while it uses two angle sensors having a dead zone.

In some embodiments, connection and disconnection of the clutch can be carried out through linear motion of the operating member by rotation of the cam member in the one direction.

In some embodiments, which one of the two angle sensors is to be used to carry out angle detection can be determined with certainty from the present position of the cam member by the decision unit.

In some embodiments, if the first cam face and the second cam face are faces having different shapes from each other, they can each be formed in a shape suitable for connection or disconnection of the clutch.

In some embodiments, if the dead zone of the first angle sensor is provided on the second cam face side and the dead zone of the second angle sensor is provided on the first cam face side, the dead zones can be disposed such that they do not overlap with each other.

In some embodiments, if the selection between the first angle sensor and the second angle sensor is changed over depending upon whether the lift state of the cam member is the top point or the bottom point, reliable changeover can be carried out at an optimum position.

In some embodiments, since the selection between the first angle sensor and the second angle sensor is changed over in response to the direction of the rotation of the cam member at the top point and the bottom point of the lift state of the cam member, rapid changeover can be carried out in the case where the cam member rotates in a forward direction and a reverse direction.

DETAILED DESCRIPTION

Figure 1:
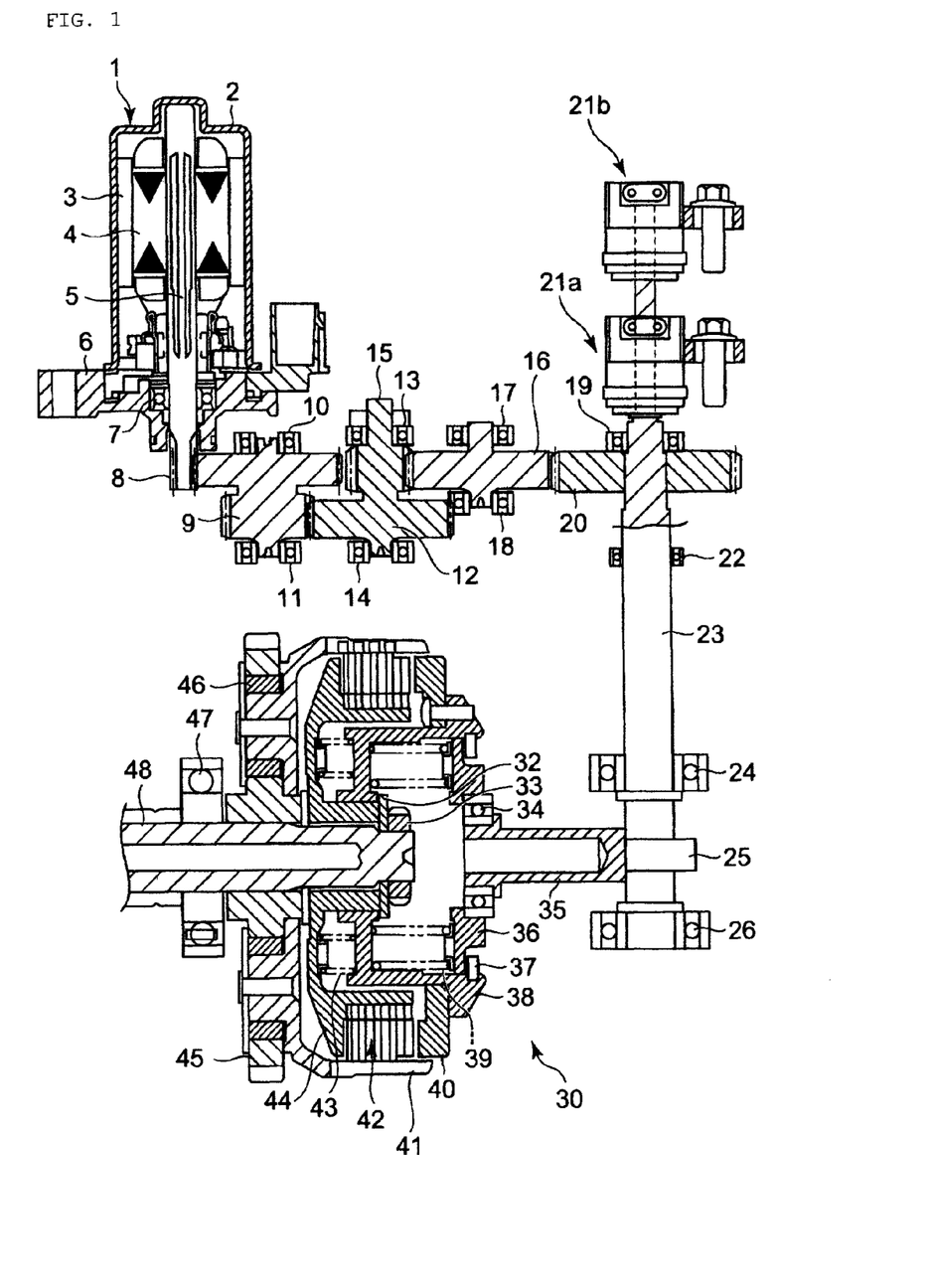
FIG. 1 is a schematic view showing a configuration of an electric clutch to which a control apparatus for a clutch driving mechanism of the present invention is applied.

An example of an embodiment of a control apparatus for a clutch driving mechanism of the present invention is described with reference to the drawings. FIG. 1 is a schematic view of an electric clutch 30 including a control apparatus for a clutch driving mechanism according to the embodiment of the present invention.

The electric clutch 30 can be a mechanism which is disposed, for example, between an engine and a transmission of a motorcycle or the like for controlling rotational driving force between connection and disconnection. The electric clutch 30 of the normally open type which is driven by an electric motor (actuator) 1 is of a double spring type including, as a biasing member for biasing the clutch in an open (disconnection) direction, a push spring 39 and a return spring 43 having spring rates different from each other.

The electric clutch 30 can be configured such that a camshaft 23 on which a cam member 25 is provided is driven to rotate by an arbitrary angle by rotational driving force of the electric motor 1 to move a push rod (operating member) 35, which contacts with the cam member 25, back and forth, thereby driving the clutch between connection and disconnection.

The electric motor 1 can be a rotor 4 formed integrally with an output power shaft 5, and a stator 3 fixed to an inner periphery of a motor housing 2. A bearing 7 which supports the output power shaft 5 for rotation is fitted in a base portion 6 which closes up an opening of the motor housing 2.

A first intermediate gear wheel 9 which is supported for rotation by bearings 10 and 11 and has two gear portions formed integrally thereon is held in meshing engagement with a gear wheel 8 formed at an end portion of the output power shaft 5. Rotational driving force transmitted to the first intermediate gear wheel 9 is transmitted to an input gear wheel 20 spline-fitted on the camshaft 23 through a second intermediate gear wheel supported for rotation by bearings 13 and 14 and a third intermediate gear wheel 16 supported for rotation by bearings 17 and 18. It should be noted that a tool attaching shaft 15, to which an emergency tool (not shown) for manually rotating the second intermediate gear wheel 12 can be attached, is provided on the second intermediate gear wheel 12.

A pair of rotational angle sensors (angle sensors) 21a and 21b, each configured from a potentiometer for detecting a rotational angle of the camshaft 23, are disposed on the upper end side in FIG. 1 of the camshaft 23. The camshaft 23 is structured such that it extends through the angle sensor 21a so that the angle sensors 21a and 21b can individually detect a rotational angle of the camshaft 23.

The camshaft 23 can be supported for rotation by a bearing 19 disposed in the proximity of the input gear wheel 20 and bearings 24 and 26 disposed on the opposite sides of the cam member 25. In some embodiments, an oil seal 22 can be disposed at a substantially middle portion of the camshaft 23. This can allow for a layout where, for example, a mechanism in a range from the electric clutch 30 to the cam member 25 can be accommodated in a crankcase of the engine while another mechanism within a range from the electric motor 1 to an intermediate portion of the camshaft 23 is disposed externally of the crankcase.

The electric clutch 30 can be attached to one end portion of a main shaft 48 as an input power shaft to a transmission (not shown). A primary driven gear wheel 45, supported for rotation on the main shaft 48 and to which rotational driving force is transmitted from a crankshaft (not shown), can be coupled to a clutch outer 41 through a plurality of annular dampers 46. A bearing for the main shaft 48 is disposed in a leftward direction in FIG. 1 of the primary driven gear wheel 45. Then, if the electric clutch 30 is placed into a connected state, then rotational driving force of the clutch outer 41 is transmitted to the main shaft 48 through a clutch inner 44.

If the push rod 35 is pushed leftwardly in FIG. 1 by rotational driving force of the electric motor 1, then a first push plate 36 is pressed through a bearing 34. The push spring 39 formed from a plurality of coil springs is disposed between the first push plate 36 and a second push plate 38, and the return spring 43 formed from a plurality of coil springs is disposed between the second push plate 38 and the clutch inner 44. If the second push plate 38 is slidably moved in the leftward direction in FIG. 1 against the biasing force of the springs 39 and 43, then a clutch connecting operation is carried out.

The second push plate 38 is held in engagement with the clutch inner 44 so that it applies a predetermined preload to the return spring 43 and is fixed to the main shaft 48 by a nut 33 through a washer 32 which restricts the range of the sliding movement in the rightward direction in FIG. 1. Further, the second push plate 38 has a range of sliding movement restricted in the rightward direction in FIG. 1 by, for example, a circlip 37. If the second push plate 38 is slidably moved in the leftward direction in FIG. 1, then a clutch plate 42 is pressed in the leftward direction in FIG. 1 by an annular pressing member 40 fixed to the second push plate 38, whereupon the electric clutch 30 is changed over from a disconnected state to a connected state.

Figure 2:
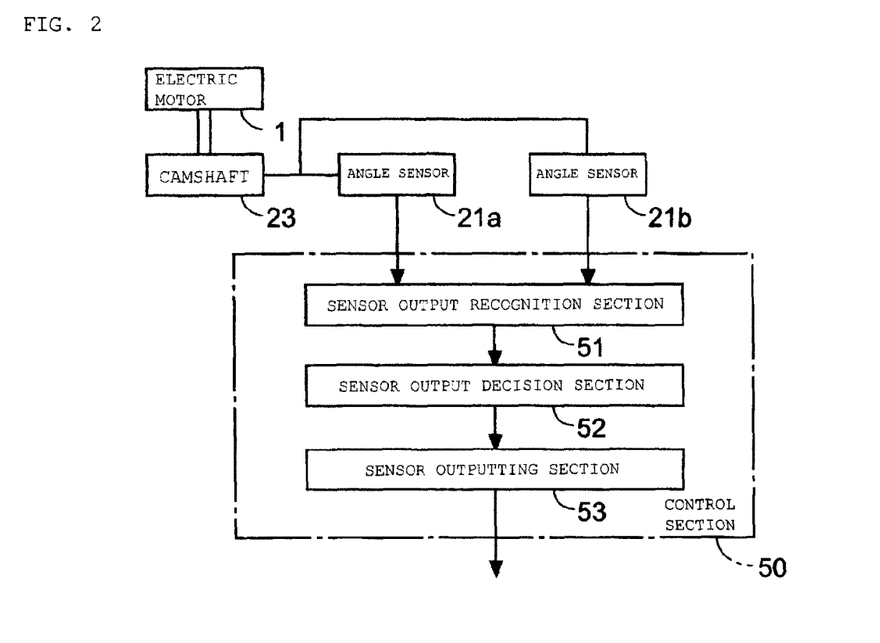
FIG. 2 is a block diagram showing a general configuration of the control apparatus for the clutch driving mechanism according to an embodiment of the present invention.

FIG. 2 is a block diagram showing a general configuration of the control apparatus for the clutch driving mechanism according to an embodiment of the present invention. Like reference symbols to those described above denote like or equivalent elements.

A control section 50 includes a sensor output recognition section 51 for recognizing sensor outputs from the angle sensors 21a and 21b, a sensor output decision section or decision unit 52 for determining which one of the two angle sensors 21a and 21b should be used to carry out angle detection. A sensor outputting section 53 is provided for outputting a sensor output from the selected angle sensor 21.

The sensor output recognition section 51 inputs sensor outputs of the angle sensors 21a and 21b to the sensor output decision section 52. The sensor output decision section 52 determines which one of the two angle sensors 21a and 21b should be used to carry out angle detection depending upon a lift state (rotational position) of the cam member 25 mounted on the camshaft 23.

Now, a detailed structure and a lift state (rotational position) of the cam member 25 are described with reference to FIGS. 3 and 4.

Figure 3:
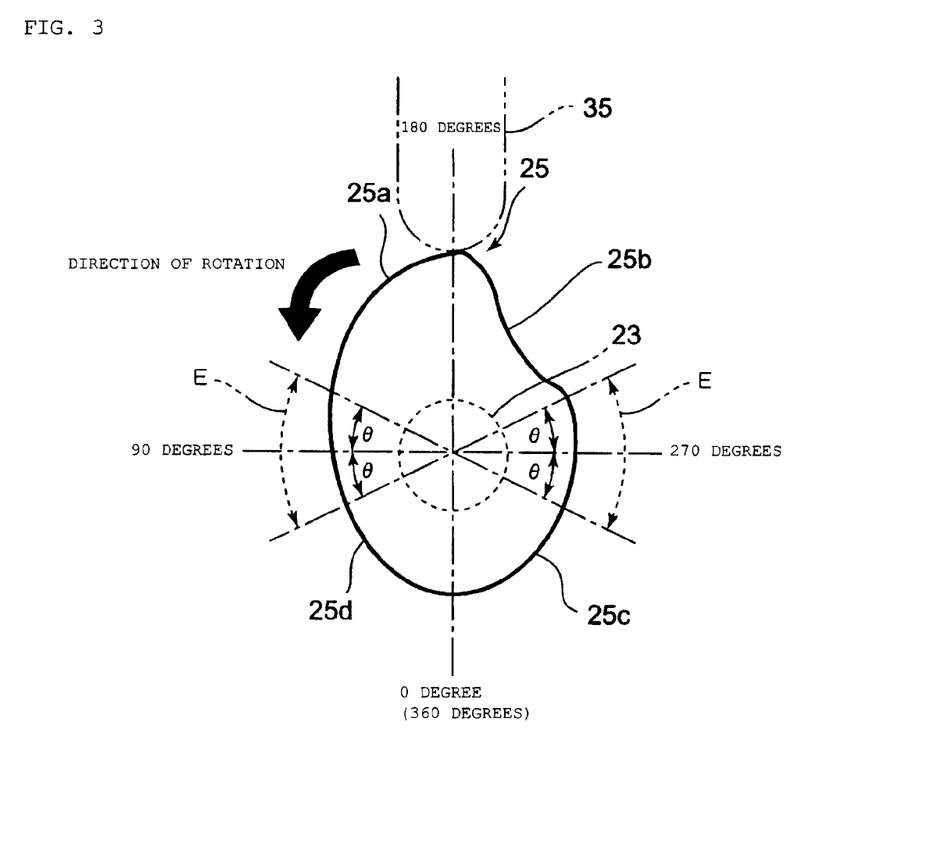
FIG. 3 is an enlarged view of a cam member in the clutch driving mechanism.
Figure 4:
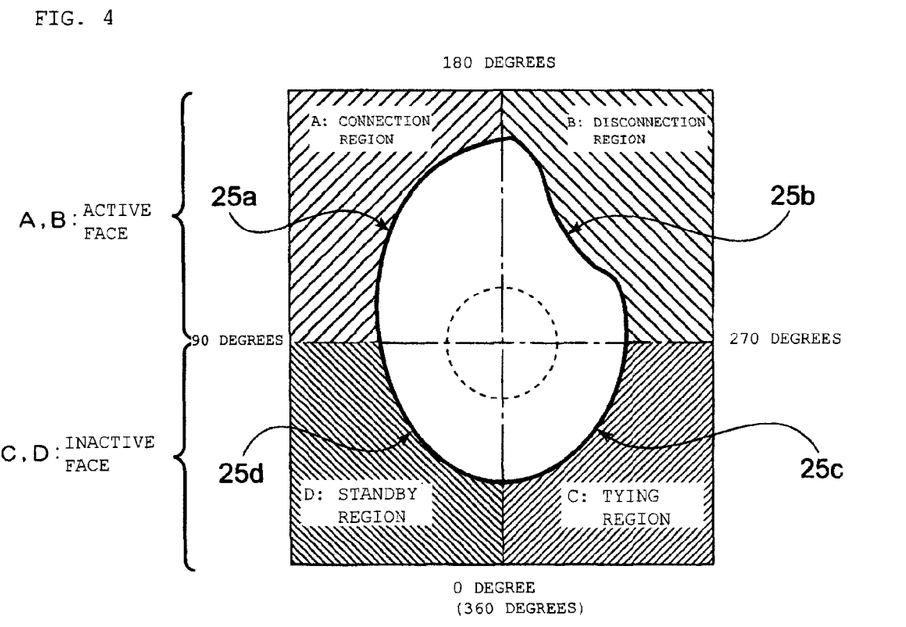
FIG. 4 is an explanatory view of a configuration of the cam member.

FIG. 3 is an enlarged view of the cam member 25 mounted on the camshaft 23. FIG. 4 is an explanatory view of a configuration of the cam member 25. The cam member 25 rotates integrally with the camshaft 23, which is driven to rotate by the electric motor 1, to move the push rod or operating member 35, which is supported for back and forth movement, back and forth in upward and downward directions in FIGS. 3 and 4. FIG. 3 illustrates a lift state (top point) in which the cam member 25 pushes the push rod 35 in the maximum.

A continuous face including cam faces 25a to 25d is formed on the cam member 25. The cam member 25 in the present embodiment is driven by the electric motor 1 such that it rotates only in the counterclockwise direction. Consequently, the cam face which contacts with the push rod 35 successively transits in an order of the cam face 25d→25a→25b→25c by rotation of the cam member 25.

Further, in the present embodiment, the cam face 25a which drives the clutch in a connection direction is set as a "connection region A;" the cam face 25b which drives the clutch in a disconnection direction is set as a "disconnection region B;" the cam face 25c which maintains the disconnected state of the clutch is set as a "tying region C;" and the cam face 25d which similarly maintains the disconnected state of the clutch is set as a "standby region D." Thus, a first cam face (25d, 25a) from the standby region D to the connection region A of the clutch and a second cam face (25b, 25c) from the disconnection region B to the tying region C of the clutch are formed.

The disconnection region B is formed such that the climax (lift amount) of the cam face 25b is small and is configured such that the clutch can be rapidly changed over from a state in which the clutch is connected by the cam face 25a to a disconnected state only by driving the electric motor 1 by a small angle. It is to be noted that the cam faces 25c and 25d can be formed from a single arc.

With respect to the camshaft 23, the first angle sensor 21a is disposed in a state in which it can detect the angular range of the first cam face 25d and 25a of the cam member 25 while the second angle sensor 21b is disposed in another state in which it can detect the angular range of the second cam face 25b and 25c. To each of the angle sensors 21, a dead zone E (FIG. 3) within which angle detection cannot be carried out is set. However, for the first angle sensor 21a, the dead zone E is provided on the second cam face 25b and 25c side while, for the second angle sensor 21b, the dead zone E is provided on the first cam face 25d and 25a side such that the dead zone of the first angle sensor 21a and the dead zone of the second angle sensor 21b are positioned in an opposing relationship and do not overlap with each other.

The sensor output decision section 52 changes over selection between the first angle sensor 21a and the second angle sensor 21b depending upon whether the lift state of the cam member 25 is the top point (180 degrees, a state in which the cam member 25 pushes the push rod 35 in the maximum as shown in FIG. 3) or the bottom point (0 degree, 360 degrees).

Figure 5:
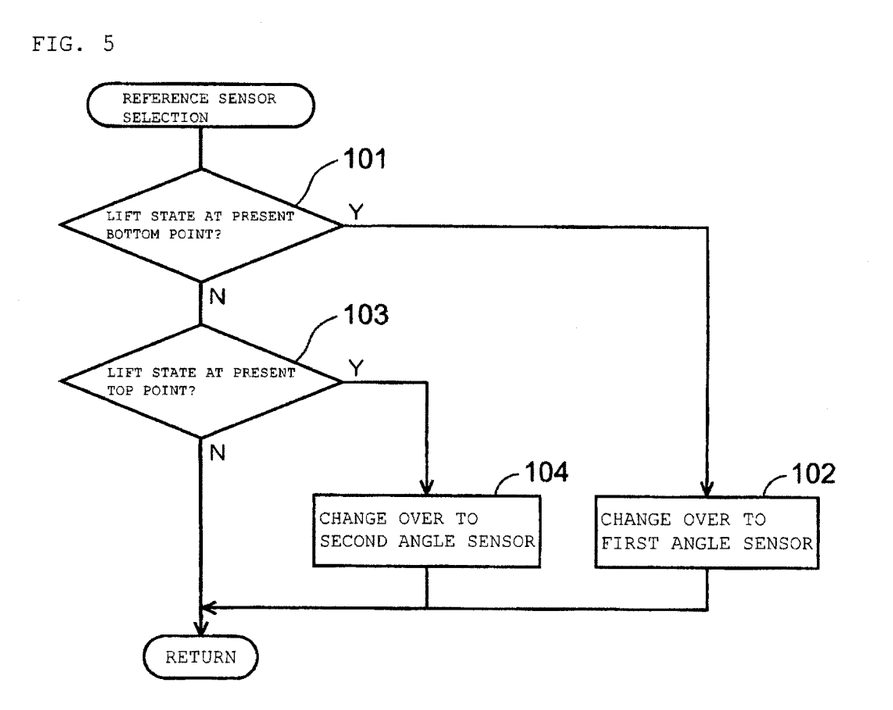
FIG. 5 is a flow chart illustrating a procedure of a sensor changeover process in the control apparatus for the clutch driving mechanism according to the embodiment of the present invention.

Now, selective changeover between sensor outputs of the first angle sensor 21a and the second angle sensor 21b by the sensor output decision section 52 is described with reference to a flow chart of FIG. 5.

When a selection process of a reference sensor is to be carried out, the present lift state is detected first (step 101). If the lift state is the bottom point (0 degree), then changeover is carried out such that a sensor output is obtained from the first angle sensor 21a (step 102). If the lift state is any other than the bottom point (0 degree), then the present lift state is detected again (step 103.) And, if the lift state is the top point (180 degrees), then changeover is carried out such that a sensor output is obtained from the second angle sensor 21b (step 104). If the second time detection of the present lift state indicates any other than the top point (180 degrees), then the state is maintained without changing over the sensor output. The processes described above are carried out repetitively to carry out changeover between the sensor outputs of the first angle sensor 21a and the second angle sensor 21b.

In particular, within a range within which the first cam face 25d and 25a of the cam member 25 contacts with the operating member 35, an angle can be detected from the sensor output of the first angle sensor 21a, but within another range within which the second cam face 25b and 25c of the cam member 25 contacts with the operating member 35, an angle can be detected from the sensor output of the second angle sensor 21b.

In the present embodiment, the connection region A and the disconnection region B are collectively referred to as "active face" of the clutch while the tying region C and the standby region D are collectively referred to as "inactive face" of the clutch.

Further, the range of the rotational angle of the cam member 25 from the position of 0 degree to the position of 90 degrees is set as the standby region D; the range between the positions of 90 degrees and 180 degrees is set as the connection region A; the range between the positions of 180 degrees and 270 degrees is set as the disconnection region B; the range between the positions of 270 degrees and 0 degree is set as the tying region C; the range between ± angles θ across the position of 90 degrees of the rotational angle of the cam member 25 is set as the dead zone E of the second angle sensor 21b; and the range between the ± angles θ across the position of 270 degrees of the rotational angle of the cam member 25 is set as the dead zone E of the first angle sensor 21a.

When the cam member 25 transits from the active face to the inactive face, the cam member 25 is driven to rotate at a fixed speed to a predetermined position of the inactive face to prepare for a next clutch connection operation. In particular, when the cam member 25 transits from the active face to the inactive face, that is, when the cam member 25 transits from the disconnection region B to the tying region C, the cam member 25 is driven to rotate at a fixed speed to a predetermined position of the standby region D.

Figure 6:
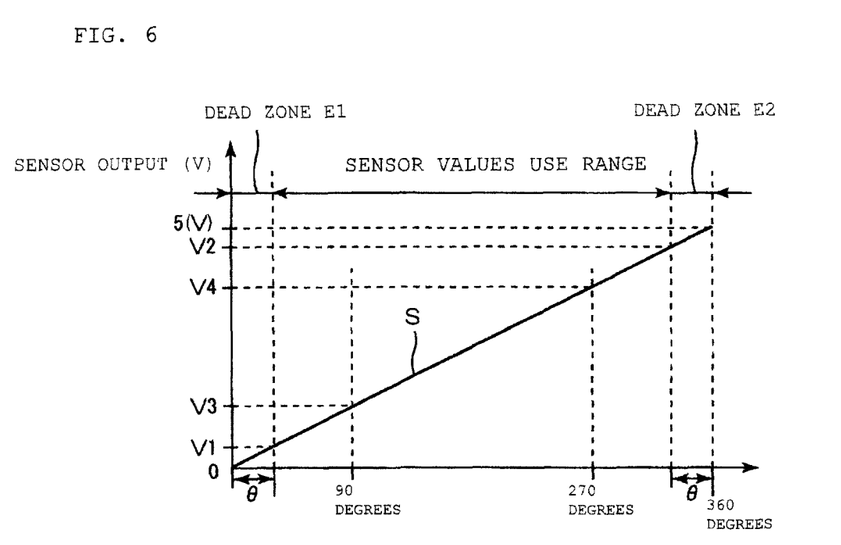
FIG. 6 is a graph illustrating an output characteristic of an angle sensor.
Figure 7:
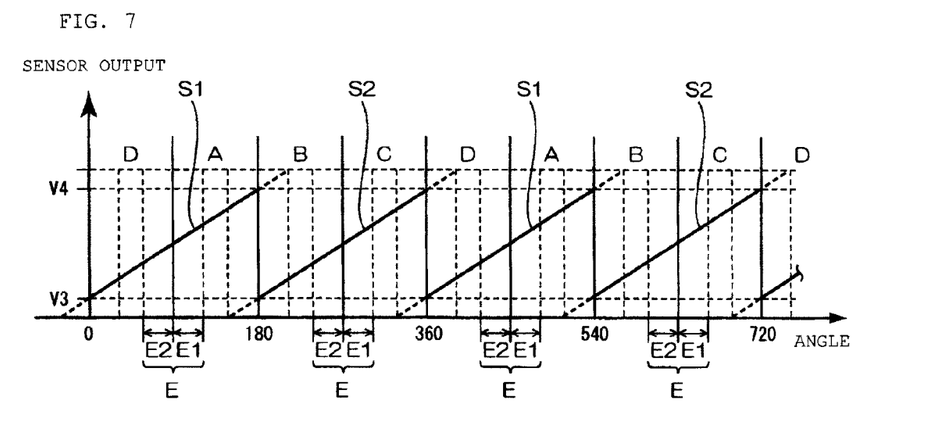
FIG. 7 is a graph illustrating a sensor output of the angle sensor when the cam rotates continuously.

FIG. 6 is a graph illustrating an output characteristic of the angle sensors 21a and 21b. FIG. 7 is a graph illustrating sensor outputs S1 and S2 obtained by changeover between the angle sensors 21a and 21b when the cam member 25 continuously rotates in one direction.

Each angle sensor 21 can be a potentiometer of an endless rotation type whose sensor output (output voltage) S increases in proportion to the rotational angle within a range of 360 degrees as illustrated in FIG. 6. In particular, the sensor output S is 0 at the angle of 0 degree and increases in proportion to the rotational angle until, for example, a maximum voltage of 5 V is generated at the angle of 360 degrees. And in the present angle sensor 21, dead zones E1 and E2 within which a rotational angle cannot be detected are set within a range from 0 to θ degrees and within a range of an angle of θ preceding to the angle of 360 degrees, and a substantially detectable sensor output (sensor values use range) is V1 to V2.

A rotational position of the camshaft 23 from 0 to 180 degrees can be detected as a sensor output V3 (first predetermined voltage=value higher than V1) to V4 (second predetermined voltage=value lower than V2) by the first angle sensor 21a. A rotational position of the camshaft 23 from 180 to 360 degrees can be detected as a sensor output V3 to V4 by the second angle sensor 21b. The angle sensors 21a and 21b are disposed such that the dead zones thereof do not overlap with each other. Consequently, when the cam member 25 continuously rotates in one direction (counterclockwise direction in FIG. 3), by changing over between the angle sensors 21a and 21b, such a voltage waveform indicated by a rightwardly upwardly inclined straight line as shown in FIG. 7 can be outputted continuously. Reference characters A, B, C and D in FIG. 7 correspond to the connection region, disconnection region, tying region and standby region of FIG. 4, respectively, and E denotes the dead zone E1 or E2 of the angle sensor 21 on the side on which the sensor output is not detected.

By changing over between the angle sensors 21a and 21b, only a value from V3 to V4 with which a high degree of accuracy can be expected can be utilized as a valid sensor value from within a sensor output from 0 V to 5 V. In particular, with regard to the range of the lift state of the cam member 25 from 0 degree to 180 degrees, a sensor output S1 from V3 (first predetermined voltage) to V4 (second predetermined voltage) is obtained by the first angle sensor 21a, and with regard to the range from 180 degrees to 360 degrees, a sensor output S2 from V3 (first predetermined voltage) to V4 (second predetermined voltage) is obtained by the second angle sensor 21b. Thereafter, with regard to a range of the lift state of the cam member 25 from 360 degrees to 540 degrees (from 0 degree to 180 degrees), a sensor output S1 from V3 (first predetermined voltage) to V4 (second predetermined voltage) is obtained by the first angle sensor 21a, and with regard to another range from 540 degrees to 720 degrees (from 180 degrees to 360 degrees), a sensor output S2 from V3 (first predetermined voltage) to V4 (second predetermined voltage) is obtained by the second angle sensor 21b.

Changeover between the angle sensors 21 can be carried out when the cam member 25 continuously rotates in one direction, the present invention may be applied to a mechanism wherein the cam member 25 rotates in forward and backward directions to carry out ON-OFF control of the clutch. In the embodiment described above, selection between the first angle sensor 21a and the second angle sensor 21b is changed over depending upon whether the lift state of the cam member 25 is the top point (180 degrees) or the bottom point (0 degree, 360 degrees). ON-OFF control of the clutch is carried out by forward and backward rotation of the cam member 25. It is determined, from the direction of rotation (direction of rotation of the cam member 25) and the position at present (top point or bottom point), which one of the two angle sensors 21 is to be used to carry out angle detection.

By carrying out changeover taking the direction of rotation of the cam member 25 into consideration, when the cam member 25 rotates forward and backward, rapid and reliable changeover can be carried out.

As described above, with the control apparatus for the clutch driving mechanism according to embodiments of the present invention, the two angle sensors 21 are used for angle detection of the cam member 25, and a dead zone of the first angle sensor 21a is provided on the second cam face 25b and 25c side while a dead zone of the second angle sensor 21b is provided on the first cam face 25d and 25a side. The dead zone of the first angle sensor 21a and the dead zone of the second angle sensor 21b can therefore be provided such that they do not overlap with each other, and angle detection with a high degree of accuracy can be achieved within the full range from 0 degrees to 360 degrees.

Accordingly, even if an angle sensor itself has a large dead zone, by disposing two angle sensors such that the dead zones thereof do not overlap with each other, detection with a high degree of accuracy can be achieved over the full range from 0 degrees to 360 degrees. As a result, it is possible to provide a control apparatus for a clutch driving mechanism at a low cost, which can use an inexpensive angle sensor having a comparatively great dead zone to carry out angle detection with a high degree of accuracy over the full range from 0 degrees to 360 degrees.

It should be noted that the shape or structure of the electric motor, cam and angle sensors, the size of the dead zones of the angular sensors, and the size, arrangement and so forth of the disconnection region, tying region, dead zone, standby region and connection region are not limited to those of the embodiment described hereinabove but can be modified in various ways, while remaining within the spirit and scope of the invention. The metes and bounds of the present invention are defined by the appended claims.

DESCRIPTION OF REFERENCE SYMBOLS

1 .... Electric motor (actuator), 21a, 21b .... Angle sensor, 23 .... Camshaft, 25 .... Cam member, 25a, 25d .... First cam face, 25b, 25c .... Second cam face, 35 .... Push rod (operating member), 50 .... Control section, 51 .... Sensor output recognition section, 52 .... Sensor output decision section (decision means), 53 .... Sensor outputting section, A .... Connection region, B .... Disconnection region, C .... Tying region, D .... Standby region, E (E1, E2) .... Dead zone, A, B .... Active face, C, D .... Inactive face, S1, S2 .... Sensor output (output voltage), V3 .... First predetermined voltage, V4 .... Second predetermined voltage.

The invention claimed is:

1. A control apparatus for a clutch driving apparatus, said control apparatus comprising:
    a cam member configured to rotate in synchronism with rotation of an actuator;
    a cam face formed in a direction of rotation of the cam member;
    an operating member configured to contact the cam face to carry out back and forth linear motion;
    a clutch driving mechanism configured to connect and disconnect a clutch in response to the back and forth linear motion of the operating member;
    an angle sensor configured to detect an angle of rotation of the cam member, said angle sensor including a dead zone against an angle of rotation which can be detected,
    wherein the cam face includes a first cam face configured to connect the clutch through the linear motion of the operating member in response to rotation of the cam member in one direction, and a second cam face formed continuously to said first cam face and configured to disconnect the clutch through the linear motion of the operating member in response to the rotation of the cam member, wherein the angle sensor includes a first angle sensor configured to detect an angular range of said first cam face, and a second angle sensor configured to detect an angular range of said second cam face, and wherein the dead zone of said first angle sensor and the dead zone of said second angle sensor being disposed in such a manner as not to overlap with each other.

2. The control apparatus for the clutch driving mechanism according to claim 1, wherein said second cam face is configured to disconnect the clutch through the linear motion of the operating member in response to the rotation of the cam member in one direction.

3. The control apparatus for the clutch driving mechanism according to claim 1, further comprising a decision unit configured to determine which one of the two angle sensors is to be used to carry out angle detection from a present position of the cam member.

4. The control apparatus for the clutch driving mechanism according to claim 1, wherein said first cam face and said second cam face are faces having different shapes from each other.

5. The control apparatus for the clutch driving mechanism according to claim 1, wherein said first angle sensor has the dead zone on a second cam face side, and said second angle sensor has the dead zone on a first cam face side.

6. The control apparatus for the clutch driving mechanism according to claim 3, wherein said decision unit is configured to change over a selection between said first angle sensor and said second angle sensor depending upon whether a lift state of said cam member is a top point or a bottom point.

7. The control apparatus for the clutch driving mechanism according to claim 3, wherein said decision unit is configured to change over a selection between said first angle sensor and said second angle sensor in response to the direction of the rotation of said cam member at a top point and a bottom point of a lift state of said cam member.

8. A clutch control apparatus, comprising:
cam means for rotating in synchronism with a rotation of an actuator;
cam face means formed in a direction of rotation of the cam means, said cam face means for transmitting motion;
operating means for contacting the cam face means and for carrying out back and forth linear motion;
clutch driving means for connecting and disconnecting a clutch in response to the back and forth linear motion of the operating means;
angle sensor means for detecting an angle of rotation of the cam means, said angle sensor means including a dead zone against a detected angle of rotation,
wherein the cam face means includes first cam face means for connecting the clutch through the linear motion of the operating means in response to rotation of the cam means in one direction, and a second cam face means formed continuously to the first cam face means, for disconnecting the clutch through the linear motion of the operating means in response to the rotation of the cam means,
wherein the angle sensor means includes first angle sensor means for detecting an angular range of the first cam face means, and a second angle sensor means for detecting an angular range of the second cam face means, and
wherein the dead zone of the first angle sensor means and the dead zone of the second angle sensor means are disposed so as not to overlap with each other.

9. The clutch control apparatus according to claim 8, wherein the second cam face means is also for disconnecting the clutch through the linear motion of the operating means in response to the rotation of the cam means in one direction.

10. The clutch control apparatus according to claim 8, further comprising decision means for determining which one of the two angle sensor means is to be used to carry out angle detection from a present position of the cam means.

11. The clutch control apparatus according to claim 8, wherein the first cam face means and the second cam face means have different shapes from each other.

12. The clutch control apparatus according to claim 8, wherein the first angle sensor means has the dead zone on a second cam face means side, and the second angle sensor means has the dead zone on the first cam face means side.

13. The clutch control apparatus according to claim 10, wherein the decision means is for changing over a selection between the first angle sensor means and the second angle sensor means depending upon whether a lift state of the cam means is a top point or a bottom point.

14. The clutch control apparatus according to claim 10, wherein the decision means is for changing over a selection between the first angle sensor means and the second angle sensor means in response to the direction of rotation of the cam means at a top point and a bottom point of a lift state of the cam means.

* * * * *